United States Patent
Loechelt

(10) Patent No.: US 9,680,381 B1
(45) Date of Patent: Jun. 13, 2017

(54) CIRCUIT INCLUDING RECTIFYING ELEMENTS AND A CHARGE STORAGE ELEMENT AND A METHOD OF USING AN ELECTRONIC DEVICE INCLUDING A CIRCUIT HAVING SWITCHING ELEMENTS

(71) Applicant: SEMICONDUCTOR COMPONENTS INDUSTRIES, LLC, Phoenix, AZ (US)

(72) Inventor: Gary H. Loechelt, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/155,307

(22) Filed: May 16, 2016

Related U.S. Application Data

(60) Provisional application No. 62/288,683, filed on Jan. 29, 2016.

(51) Int. Cl.
*H02M 3/335* (2006.01)
*H02M 3/158* (2006.01)
*H02M 1/12* (2006.01)

(52) U.S. Cl.
CPC ............ *H02M 3/158* (2013.01); *H02M 1/12* (2013.01)

(58) Field of Classification Search
CPC ...... H02M 3/337; H02M 1/44; H02M 1/4225; H02M 2001/342; Y02B 70/1491
USPC .......... 363/16–20, 37, 41, 56.01, 65, 97, 98, 363/131, 132; 323/222, 224, 235, 323/282–288
See application file for complete search history.

(56) References Cited

U.S. PATENT DOCUMENTS

| | | | |
|---|---|---|---|
| 5,739,564 A | 4/1998 | Kosa et al. | |
| 6,195,270 B1 * | 2/2001 | Wittenbreder | .... H02M 3/33576 363/127 |
| 6,198,260 B1 * | 3/2001 | Wittenbreder | ........ H02M 3/158 323/271 |
| 6,452,814 B1 * | 9/2002 | Wittenbreder | .......... H02M 1/34 363/127 |
| 7,321,224 B2 * | 1/2008 | Iwamoto | ................. H02M 1/34 323/222 |

(Continued)

OTHER PUBLICATIONS

Shoyama, Masahito et al., "Resonant Switched Capacitor Converter with High Efficiency," 35th Annual IEEE Power Electronics Specialists Conference, Aachen, Germany, dated 2004, pp. 3780-3786.

*Primary Examiner* — Rajnikant Patel
(74) *Attorney, Agent, or Firm* — Abel Law Group, LLP

(57) ABSTRACT

A circuit can include a switching element, a charge storage element, a first rectifying element, and a second rectifying element. A current-carrying electrode of the switching element and a terminal of the charge storage element are coupled to each other. The other terminal of the charge storage element, an anode of the first rectifying element, and a cathode of the second rectifying element are coupled to a floating node. A cathode of the first rectifying element is coupled to an input terminal, and an anode of the second rectifying element is coupled to a reference node. In a particular embodiment, the circuit can be part of a power converter. The charge storage element can help to capture charge during a switching operation and release the captured charge during a subsequent switching operation. The charge storage element can help the circuit to operate more efficiently.

20 Claims, 5 Drawing Sheets

(56) References Cited

U.S. PATENT DOCUMENTS

| | | | |
|---|---|---|---|
| 8,139,379 B2 * | 3/2012 | Shih | H02M 3/335 363/21.08 |
| 9,070,562 B2 | 6/2015 | Loechelt et al. | |
| 2009/0033289 A1 | 2/2009 | Xing et al. | |
| 2012/0126767 A1 | 5/2012 | Luo et al. | |
| 2014/0001856 A1 | 1/2014 | Agamy et al. | |

* cited by examiner

US 9,680,381 B1

CIRCUIT INCLUDING RECTIFYING ELEMENTS AND A CHARGE STORAGE ELEMENT AND A METHOD OF USING AN ELECTRONIC DEVICE INCLUDING A CIRCUIT HAVING SWITCHING ELEMENTS

CROSS-REFERENCE TO RELATED APPLICATION(S)

This application claims priority to U.S. Provisional Application No. 62/288,683, filed on Jan. 29, 2016, entitled "Circuit Including Rectifying Elements and a Charge Storage Element and a Method of Using nn Electronic Device Including a Circuit Having Switching Elements," invented by Gary H. Loechelt, and is incorporated herein by reference and priority thereto for common subject matter is hereby claimed.

FIELD OF THE DISCLOSURE

The present disclosure relates to circuits including rectifying elements and charge storage elements and methods of using electronic devices including circuits having switching elements.

RELATED ART

Power converters can have relatively high current flow that switch at a relatively high frequency. An example of such a power converter can be a high-frequency voltage regulator. Switching within the power converter can cause ringing at a switching node. Improvements in reduced ringing and recovering energy during and after switching are desired.

BRIEF DESCRIPTION OF THE DRAWINGS

Embodiments are illustrated by way of example and are not limited in the accompanying figures.

Figure 1:
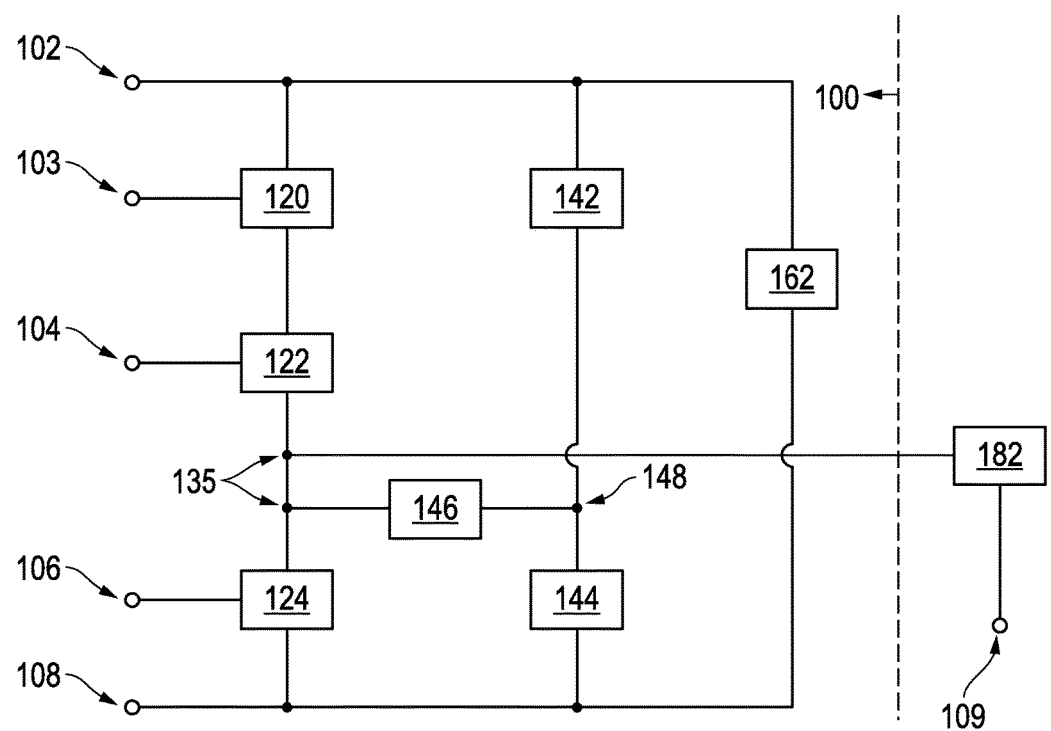
FIG. 1 includes a diagram of a circuit in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Also, for conceptual simplicity, some structures that are represented by a single circuit element may in fact correspond to multiple physical elements connected either in series, in parallel, or in some other series and parallel combination.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

As used herein, the term "coupled" is intended to mean a connection, linking, or association of two or more electronic components, circuits, systems, or any combination of: (1) at least one electronic component, (2) at least one circuit, or (3) at least one system in such a way that a signal (e.g., current, voltage, or optical signal) may be transferred from one to another. Non-limiting examples of "coupled" can include electrical connections between electronic component(s), circuit(s) or electronic component(s) with switch(es) (e.g., transistor(s)) connected between them, or the like.

The term "electrically connected," with respect to electronic components, circuits, or portions thereof, is intended to mean that two or more electronic components, circuits, or any combination of at least one electronic component and at least one circuit do not have any intervening electronic component lying between them. Parasitic resistance, parasitic capacitance, parasitic inductance, or any combination thereof is not considered an electronic component for the purposes of this definition. In one embodiment, electronic components are electrically connected when they are electrically shorted to one another and lie at substantially the same voltage.

The terms "high power supply" and "low power supply" are relative to each other such that the voltage of the high power supply minus the voltage of the lower power supply is greater than 0 V (i.e., $(V_{HPS}-V_{LPS})>0$ V). For example, both $V_{HPS}$ and $V_{LPS}$ can be positive voltages; both $V_{HPS}$ and $V_{LPS}$ can be negative voltages; $V_{HPS}$ can be a positive voltage, and $V_{LPS}$ can be a negative voltage or 0 V; or $V_{HPS}$ can be a positive voltage or 0V, and $V_{LPS}$ can be a negative voltage.

The term "normal operation" and "normal operating state" refer to conditions under which an electronic component or device is designed to operate. The conditions may be obtained from a data sheet or other information regarding voltages, currents, capacitance, resistance, or other electrical conditions. Thus, normal operation does not include operating an electrical component or device well beyond its design limits.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the semiconductor and electronic arts.

A circuit can include a component that captures and subsequently releases charge that improves the efficiency of the circuit. In an embodiment, the circuit can include a switching element, a charge storage element, a first rectifying element, and a second rectifying element. A current-carrying electrode of the switching element and a terminal of the charge storage element are coupled to each other. The other terminal of the charge storage element, an anode of the first rectifying element, and a cathode of the second rectifying element are coupled to a floating node. A cathode of the first rectifying element is coupled to an input terminal, and an anode of the second rectifying element is coupled to a reference node. In a particular embodiment, the circuit can be part of a power converter. The capacitive element can help to capture charge during a switching operation and release the captured charge during a subsequent switching operation. The charge storage element can help the circuit to operate more efficiently.

In a particular embodiment, the circuit can be part of a power converter than includes a high-side transistor, a low-side transistor, a capacitor, and first and second Schottky diodes. A floating node is coupled to a terminal of the capacitor, the anode of the first Schottky diode, and the cathode of the second Schottky diode. The other terminal of the capacitor, the source of the high-side transistor, and the drain of the low-side transistor are coupled to a switching node. During operation, charge can be stored in the capacitor when the high-side transistor is in an on-state, and the low-side transistor is in an off-state. When the high-side transistor is turned off, charge stored in the capacitor can be released to the switching node and allow for more energy to be provided to a load downstream of the switching node.

In a particular embodiment, an optional voltage filter can be implemented. The input to the voltage filter can be coupled to the cathode of the first rectifying element, and an output terminal of the filter can be coupled to a current-carrying electrode of a switching element, such as the high-side transistor in a more particular embodiment, or another component within the circuit. The voltage filter can help to reduce variations in the voltage provided to a switching element or other component, and thus, reduce ringing at the switching node during a switching operation. The circuits, implementation details, and operation are better understood in conjunction with the figures and description below.

FIG. 1 includes a diagram of a circuit 100 (to the left of the dashed line in FIG. 1) in accordance with an embodiment. The circuit 100 includes a switching element 122 having a current-carrying electrode coupled to the high power supply terminal 102, and another current-carrying electrode coupled to a switching node 135. The circuit 100 further includes a switching element 124 having a current-carrying electrode coupled to the low power supply terminal 108, and another current-carrying electrode coupled to the switching node 135. The switching elements 122 and 124 have control electrodes that are coupled to control terminals 104 and 106, respectively, for the circuit 100. The switching elements 122 and 124 can be field-effect transistors, bipolar transistors, another suitable type of switching element structure for a switching circuit, or any combination thereof. Each of the switching elements 122 and 124 can include a plurality of transistor structures that are connected in parallel, such that the combination of transistor structures is electrically equivalent to a single transistor.

If needed or desired, a filter 120 can be implemented between the high power supply terminal 102 and the switching element 122. An input terminal of the filter 120 is coupled to the high power supply terminal, and an output terminal of the filter 120 is coupled to a current carrying electrode of the switching element. The filter 120 further includes a reference power supply terminal 103. Filter 120 can be a low-pass filter used to allow direct current to flow from the high power supply terminal 102 to a current carrying electrode of the switching element while blocking high-frequency noise generated by the switching of element 122 from propagating back into the power supply. The significance of the filter 120 will be described in more detail with respect to the operation of the circuit 100.

The circuit 100 further includes rectifying elements 142 and 144. The rectifying element 142 has a cathode that is coupled to the high power supply terminal 102, and an anode that is coupled to a cathode of the rectifying element 144. An anode of the rectifying element 144 is coupled to the low power supply terminal 108. The rectifying elements 142 and 144 can be pn junction diodes, Schottky diodes, another suitable rectifying element structure, or any combination thereof. Each of the rectifying elements 142 and 144 can include a plurality of diodes that are connected in parallel, such that the combination of diodes is electrically equivalent to a single diode.

The circuit 100 still further includes a charge storage element 146. The charge storage element 146 has an electrode that is coupled to the switching node 135, and another electrode that is coupled to the anode of the rectifying element 142 and the cathode of the rectifying element 144 at a floating node 148. The charge storage element 146 accumulates excess charge and releases charge during switching operations and will be described in more detail later in this specification.

The circuit 100 includes a charge storage element 162. The charge storage element 162 has an electrode that is coupled to the high power supply terminal 102, and another electrode that is coupled to the low power supply terminal 108.

The charge storage elements 146 and 162 can be in the form of parallel-plate capacitor structures, field-effect transistor structures, another suitable charge storage element structure, or any combination thereof. Each of the charge storage elements 146 and 162 can include a plurality of structures that are connected in parallel, such that the combination of structures is electrically equivalent to a single capacitor.

The circuit 100 can be used to drive a load 182. The load 182 has an input terminal coupled to the switching node 135 and another terminal that is coupled to power supply terminal 109. In a particular embodiment, the power supply terminals 103, 108, and 109 are ground terminals that are connected to ground when the circuit 100 is in operation.

Figure 2:
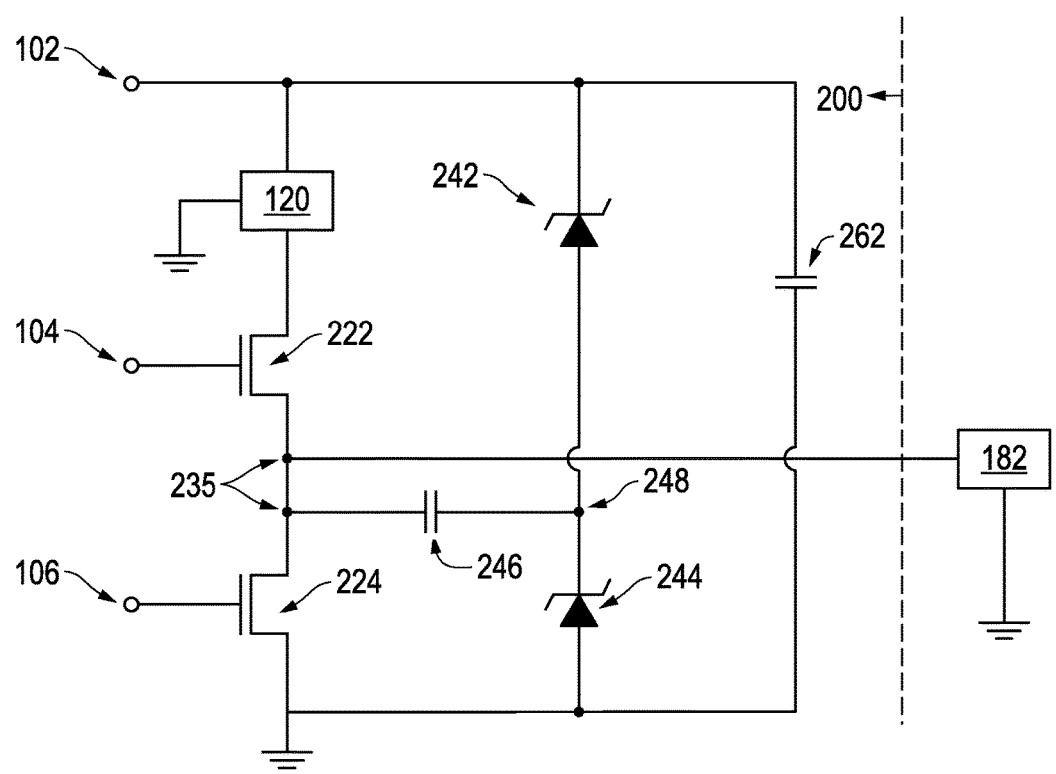
FIG. 2 includes a diagram of the circuit in FIG. 1 with particular circuit elements in accordance with a particular embodiment.

FIG. 2 includes a diagram of a particular circuit 200 that is a non-limiting implementation of the circuit 100 in accordance with an embodiment. The circuit 200, as illustrated to the left of the dashed line in FIG. 2, is a switching circuit, and more particularly is a buck converter and can be used as a high-frequency voltage regulator. The switching elements 122 and 124 in FIG. 1 are n-channel IGFETs 222 and 224 in FIG. 2. The IGFETs 222 and 224 have their bodies tied to their sources.

The active regions of the IGFETs 222 and 224 form pn junction diodes. The pn junction diodes of the IGFETs 222 and 224 can be used to determine maximum sustainable voltage differences that can be maintained across the drains and sources of the IGFETs 222 and 224. Such a voltage difference can be referred to as a drain-to-source breakdown voltage. The normal operating voltages of the switching circuit 200 may determine the breakdown voltage in selecting the IGFETs. The breakdown voltage may be at least two times the voltage between the terminals of the power supply 102 and ground. The IGFETs 222 and 224 may have approximately the same drain-to-source breakdown voltage or different drain-to-source breakdown voltages. As will be discussed later in this specification, the rectifying elements help to reduce the likelihood that the drain-to-source breakdown of an IGFET occurs during a transient time after the state of one or both of the IGFETs is changed.

The rectifying elements 142 and 144 in FIG. 1 are Schottky diodes 242 and 244 in FIG. 2. In another embodiment, each of the Schottky diodes 242 and 244 can be replaced by pn diodes, or a combination of pn junction diodes and Schottky diodes. The Schottky diodes 242 and 244 help to protect the IGFETs 222 and 224, respectively, from over-voltage due to ringing that can occur during switching operation. The reverse-bias breakdown voltage of the Schottky diodes 242 and 244 may be no greater than the drain-to-source breakdown voltage of the IGFETs 222 and 224, respectively. The Schottky diodes 242 and 244 can have the same reverse-bias breakdown voltage or different reverse-bias breakdown voltages.

The charge storage elements 146 and 162 in FIG. 1 are capacitors 246 and 262 in FIG. 2. The capacitor 246 serves a different function as compared to the capacitor 262. The capacitor 246, in conjunction with the Schottky diodes 242 and 244 can store excess charge that is collected during ringing when the IGFET 224 is off and the IGFET 222 is turned on, and to release that charge when the IGFET 222 is off and the IGFET 224 is turned on. The sizing of the capacitor 246 may depend on the designed current and voltages for the circuit 200 and the characteristics of the IGFETS 222 and 224 and the Schottky diodes 242 and 244. In an embodiment, the capacitance of the capacitor 246 is at least 0.2 nF, at least 0.5 nF or at least 1.1 nF, and in another embodiment, the capacitance of the capacitor 246 is at most 50 nF, at most 20 nF, or at most 11 nF. In a particular embodiment, the capacitance of the capacitor 246 is in a range of approximately 0.2 nF to 50 nF, 0.5 nF to 20 nF, or 1.1 nF to 11 nF.

The capacitance of the capacitor 262 can help to reduce voltage swings that the circuit 200 experiences at the high power supply terminal 102 and a ground terminal. In an embodiment, the capacitance of the capacitor 262 can be in a range of approximately 1.5 µF to approximately 40 µF.

Many values have been provided for the electronic elements within the circuits 100 and 200. Such values are provided to illustrate and not to limit the scope of the concepts as described herein. After reading this specification, skilled artisans will appreciate that the selection of absolute or relative values depends upon the particular application or environment in which the circuit is to operate.

In the circuits as described in 100 and 200 in FIGS. 1 and 2, many of the couplings between circuit elements can be electrical connections. With respect to FIG. 2, the switching node 235 of the circuit 200 can include the source of the IGFET 222, the drain of IGFET 224, and one of the electrodes of the capacitor 246. Another node can include the high power supply terminal 102, an input of the filter 120, the cathode of the Schottky diode 242, and one of the electrodes of the capacitor 262. A further node can include the ground terminal, the source of the IGFET 224, the anode of the Schottky diode 244, and the other electrode of the capacitor 262. A floating node 248 includes the other electrode of the capacitor 246, the anode of the Schottky diode 242, and the cathode of the Schottky diode 244. The floating node 248 electrically floats except when the forward bias voltage of one of the Schottky diodes 242 and 244 is exceeded. The Schottky diodes 242 and 244 are usually reversed biased except for brief periods of time during switching transients.

Figure 3:
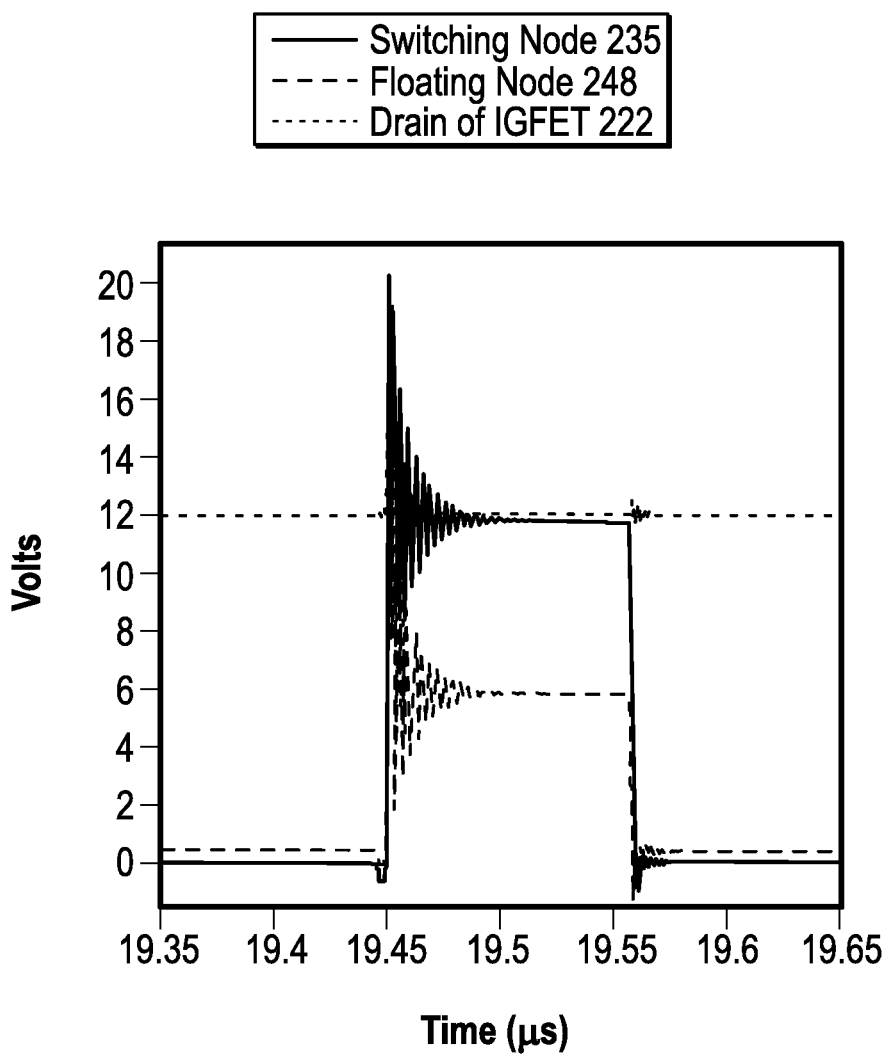
FIG. 3 includes a timing diagram of the circuit of FIG. 2 illustrating voltages at different nodes within the circuit at different switching times.

The operation of the circuits 100 and 200 are better understood with a plot of node voltages as a function of time before, during, and after switching operations, as illustrated in FIG. 3. To simplify understanding, the operation will be described with respect to the circuit 200 in FIG. 2 for a circuit designed to operate with a high power supply terminal 102 at 12 V, the low power supply at 0 V, a time-averaged voltage of 1.2 V at the switching node, and an operational frequency of 1 MHz. For different voltages, different appropriately sized components may be used, and the operation will be similar to operation described below.

The timing diagram starts with the IGFET 222 (high-side FET) off and the IGFET 224 (low-side FET) on. The voltage at the drain of the IGFET 222 (output of the filter 120) is 12 V, the voltage at the switching node 235 is close to 0 V, and the voltage at the floating node 248 is close to the same voltage as the switching node and, in an embodiment, is between 0 V and 0.5 V.

During a switching operation, the IGFET 224 is turned off, and a few nanoseconds later (<5 ns), the IGFET 222 is turned on. The sudden change in voltage causes ringing at the drain of the IGFET 222, the switching node 235, and the floating node 248. On a relative basis, the ringing at the drain of the IGFET 222 can be significantly shorter than the ringing at the switching node 235 and the floating node 248, particularly if there is parasitic inductance in the electrical connection between the source of IGFET 222 and the drain of IGFET 224. When the voltage at the switching node 235 exceeds the voltage at the high power supply terminal 102, current flows from the switching node 235 back to the high power supply terminal 102 through capacitor 246 and Schottky diode 242, thereby charging capacitor 246. After 15 ns, most of the ringing at the drain of the IGFET 222 has subsided and the voltage at the drain of the IGFET is 12 V. After about 50 ns, most of the ringing at the switching node 235 and the floating node 248 has subsided. The voltage at the switching node 235 is close to the same voltage as the drain of the IGFET 222 and, in an embodiment, is between 12 V and 11.5 V. The voltage at the floating node 248 is close to the ½ of the voltage difference between the switching node 235 and the ground terminal and, in an embodiment, is between 6 V and 5.5 V. The charging of capacitor 246 is evident in the larger voltage difference between the switching node 235 and the floating node 248 after the switching operation as compared to before the switching operation.

During a subsequent switching operation, the IGFET 222 is turned off, and a few nanoseconds later (<5 ns), the IGFET 224 is turned on. The sudden change in voltage causes ringing at the drain of the IGFET 222, the switching node 235, and the floating node 248. At each of the drain of the IGFET 222, the switching node 235, and the floating node 248, the voltage swings during ringing and the duration of the ringing is significantly smaller as compared to the first switching operation. Immediately after the switching operation (e.g., within a few nanoseconds), current flows from ground to the switching node 235 through capacitor 246 and Schottky diode 244, thereby discharging capacitor 246. After the ringing has subsided, the voltage at the drain of the IGFET 222 is 12 V, the voltage at the switching node 235 is close to 0 V, and the voltage at the floating node 248 is close to the same voltage as the switching node and, in an embodiment, is between 0 V and 0.5 V. The discharging of capacitor 246 is evident in the smaller voltage difference between the switching node 235 and the floating node 248 after the switching operation as compared to before the switching operation.

Figure 4:
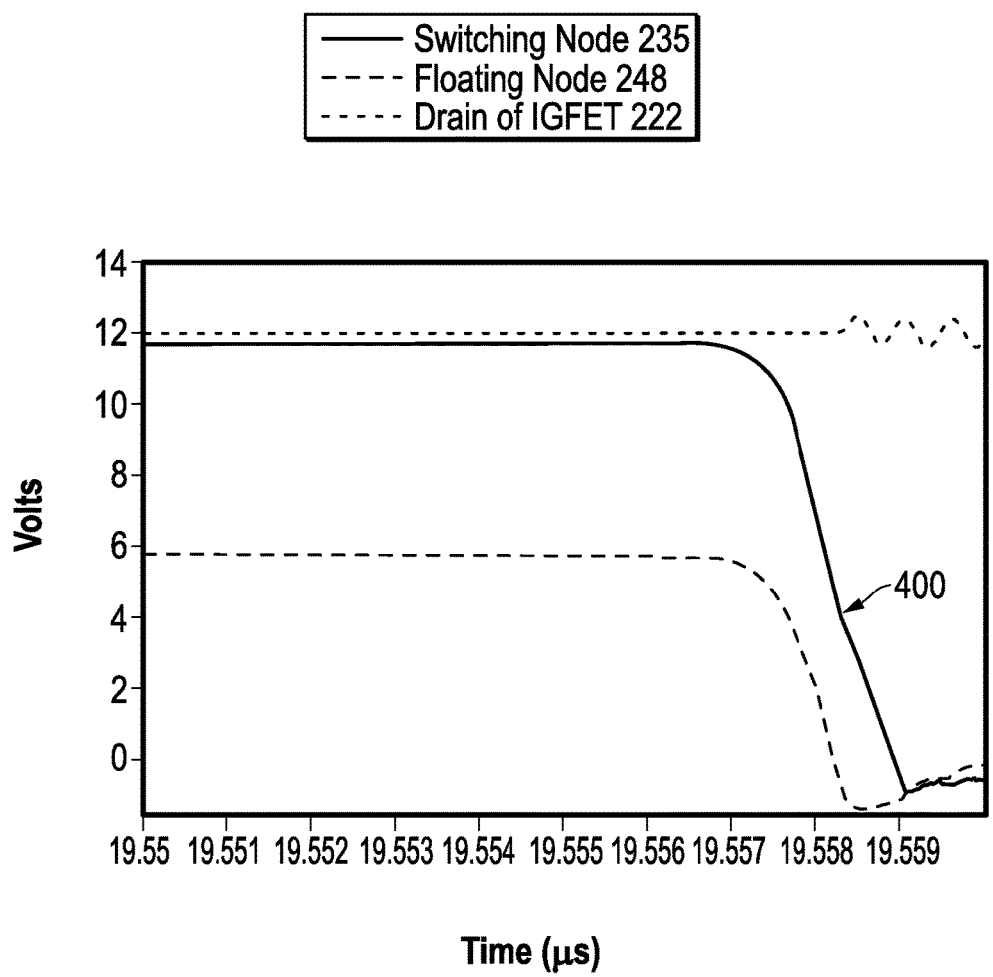
FIG. 4 includes an enlarged portion of the timing diagram of FIG. 2.

FIG. 4 includes an expanded plot of the waveforms of the voltage at the drain of the IGFET 222, the switching node 235, and the floating node 248 regarding a switching operation. The left-hand side of the waveforms corresponds to the IGFET 222 in the on-state and IGFET 224 in the off state. The voltage at the switching node 235 is close to the same voltage as the drain of the IGFET 222 and, in an embodiment, is between 12 V and 11.5 V. The voltage at the floating node 248 is close to the ½ of the voltage difference between the switching node 235 and the ground terminal and, in an embodiment, is between 6 V and 5.5 V.

The IGFET 222 is turned off. The voltages at the switching node 235 and the floating node 248 begin to decrease. Once the voltage on the floating node 248 decreases to a value below 0 V, the rate of voltage drop at the switching node 235 decreases. Thus, a change in voltage of the switching node 235 as a function of time has a slope that is relatively steeper when the voltage on the floating node 248 is greater than 0 V, and a change in voltage of the switching node 235 as a function of time has a slope that is relatively shallower when the voltage on the floating node 248 is less than 0 V. In FIG. 4, arrow 400 points to the curve where the change in slope occurs. In a particular embodiment, the slope of the relatively steeper portion is greater than the slope of the relatively shallower portion by a factor of at least 1.5. Although not to be bound by theory, the capacitor 246 is believed to be discharging, which transfers its stored energy to the load 182 and lowers the rate at which the voltage drops at the switching node 235.

Figure 5:
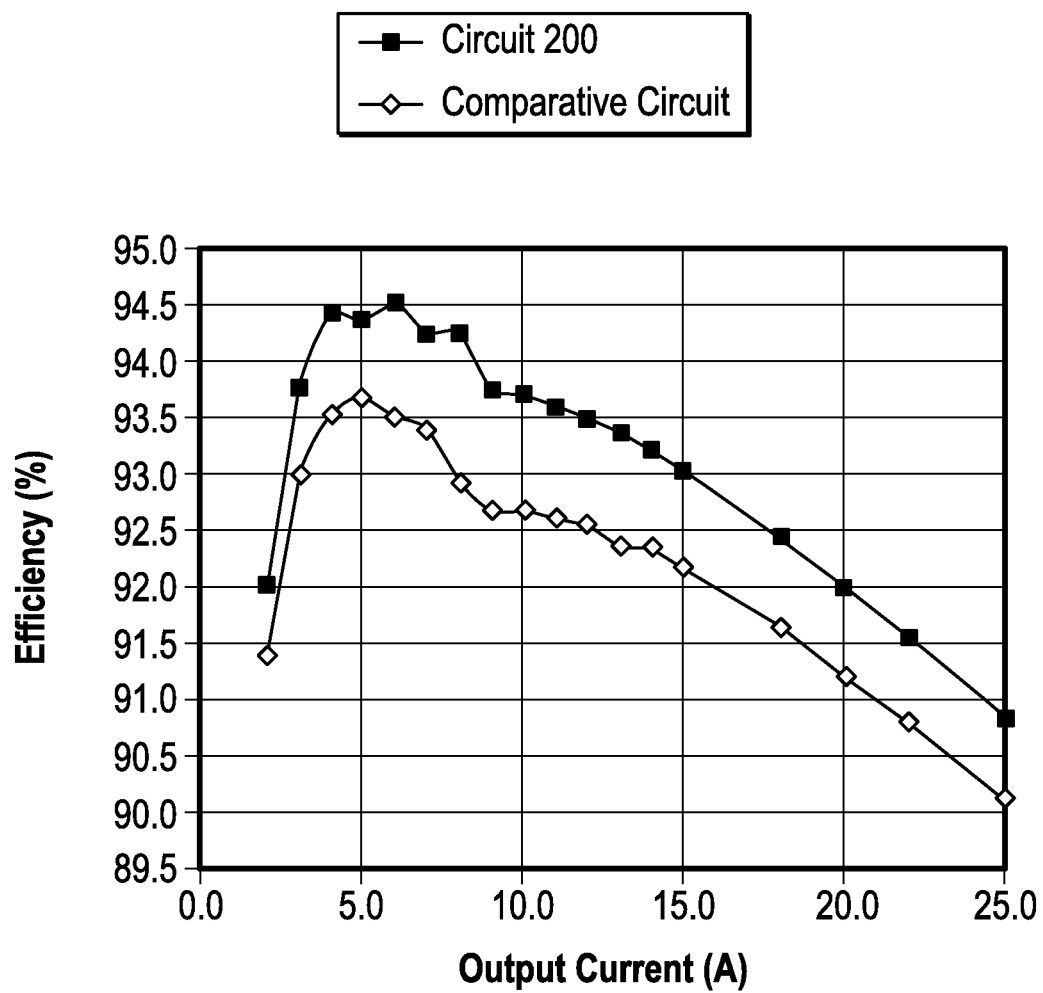
FIG. 5 includes a plot of efficiency versus output current for a circuit as described herein and a comparative circuit.

The circuits as described herein are more efficient than comparative circuits designed for the same voltages and operational frequencies. FIG. 5 includes a plot of efficiency of the circuit as described herein and a comparative circuit that does not have the capacitor 246. The curves in the plot are based on a simulation of a power convertor where the high power supply terminal is at 12 V, the output voltage is at 1.2 V, and the circuit operates at a frequency of 1 MHz. The output current is varied from approximately 2 A to 25 A. For a particular implementation, the efficiency of the circuit increases by up to 2% and overall increases on average by 0.8% to 1.1%.

Comparative circuits dissipate much of their excess ringing energy in the parasitic resistance of the power loop between the high power and lower power supply terminals. The circuits of the embodiments described above capture some of this excess energy in a charge storage element, such as a capacitor, and subsequently release that stored energy to the load, rather than dissipating it in the power loop. Thus, the circuit has a higher efficiency. Furthermore, ringing at the switching node is reduced, allowing the circuit to achieve a steady-state voltage at the switching node more quickly. This reduction in ringing may also permit switching devices with lower breakdown voltages to be used in the circuit.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A circuit comprising
an input node, a switching node, and a reference node;
a first switching element having a first current-carrying electrode coupled to the switching node;
a first charge storage element having a first terminal and a second terminal, wherein the first terminal of the first charge storage element is coupled to the switching node;
a first rectifying element having an anode and a cathode, wherein the anode of the first rectifying element is coupled to the second terminal of the first charge storage element, and the cathode of the first rectifying element is coupled to the input node; and
a second rectifying element having an anode and a cathode, wherein the cathode of the second rectifying element is coupled to the second terminal of the first charge storage element, and the anode of the second rectifying element is coupled to the reference node.

Embodiment 2

The circuit of Embodiment 1, wherein the first switching element has a second current-carrying electrode that is coupled to the input node.

Embodiment 3

The circuit of Embodiment 2, further comprising:
a first conduction path that couples the second current-carrying electrode of the first switching element to the input node;
a second conduction path that couples the cathode of the first rectifying element to the input node; and
at least part of the first conduction path is not included in the second conduction path, and at least part of the second conduction path is not included in the first conduction path.

Embodiment 4

The circuit of Embodiment 3, further comprising a second charge storage element having a first terminal and a second terminal, wherein the first terminal of the second charge storage element is coupled to the input node through at least part of the second conduction path.

Embodiment 5

The circuit of Embodiment 4, wherein the second terminal of the second charge storage element is coupled to the reference node.

Embodiment 6

The circuit of Embodiment 3, further comprising a filter that lies along the first conduction path between the input node and the second current-carrying electrode of the first switching element.

Embodiment 7

The circuit of Embodiment 6, wherein the cathode of the first rectifying element is coupled to an input of the filter.

Embodiment 8

The circuit of embodiment 3, further comprising a second switching element having a first current-carrying electrode coupled to the switching node.

Embodiment 9

The circuit of embodiment 8, wherein a second current-carrying electrode of the second switching element is coupled to the reference node.

Embodiment 10

The circuit of Embodiment 1, wherein the first charge storage element has a capacitance in a range of 0.2 nF to 50 nF.

Embodiment 11

A circuit comprising
a first switching element having a first current-carrying electrode and a second current-carrying electrode;
a first rectifying element having an anode and a cathode; and
a low-pass filter having an input terminal and an output terminal,
wherein:
  a first power supply terminal is coupled to the cathode of the first rectifying element and an input terminal of the low-pass filter; and
  the output of the low-pass filter is coupled to the first current-carrying electrode of the first switching element.

Embodiment 12

The circuit of Embodiment 11, further comprising a charge storage element having a first terminal and a second terminal, wherein
the first terminal is coupled to the anode of the first rectifying element; and
the second terminal is coupled to the second current-carrying electrode of the first switching element.

Embodiment 13

The circuit of Embodiment 12, further comprising a second rectifying element having an anode and a cathode, wherein the cathode of the second rectifying element is coupled to the first terminal of the charge storage element and the anode of the first rectifying element.

Embodiment 14

The circuit of Embodiment 13, further comprising a second switching element having a first current-carrying electrode and a second current-carrying electrode, wherein:
  the second current-carrying electrode of the first switching element, the first current-carrying electrode of the second switching element, and the second terminal of the charge storage element are coupled to a switching node; and
  a second power supply terminal is coupled to the second current-carrying electrode of the second switching element and the anode of the second rectifying element.

Embodiment 15

A method of using an electronic device including a circuit having an input terminal, a switching terminal, and a reference terminal, the method comprising:
  changing a state of a switching element within the circuit to an off-state, wherein a waveform of the switching terminal comprises:
    a first portion in which a voltage of the switching terminal is between the voltage of the input terminal and an intermediate voltage, wherein the intermediate voltage is between the voltage of the input terminal and the reference terminal, and wherein a change in voltage of the switching terminal during the first portion falls as a function of time along a first slope; and
    a second portion in which the voltage of the switching terminal is between the intermediate voltage and the voltage of the reference terminal, and wherein a change in voltage of the switching terminal during the second portion falls as a function of time along a second slope,
  wherein the second portion occurs after the first portion, and the first slope is larger in absolute value than the second slope.

Embodiment 16

The method of Embodiment 15, further comprising changing a state of the switching element to an on-state before changing the state of the switching element to an off-state, wherein the pulse shape of the waveform of the switching terminal further comprises:
  a third portion in which a voltage of the switching terminal is approximately the voltage of the reference terminal;
  a fourth portion in which the voltage of the switching terminal rises between the voltage of the reference terminal and the voltage of the input terminal, wherein a change in voltage of the switching terminal during the fourth portion rises as a function of time along a third slope; and
  a fifth portion in which the voltage of the switching terminal is approximately the voltage of the input terminal.

Embodiment 17

The method of Embodiment 16, wherein after changing the state of the switching element to an on-state:

the intermediate voltage is at least 1.2 V greater than the voltage of the reference terminal; and the intermediate voltage is at least 1.2 V lower than the voltage of the input terminal.

Embodiment 18

The method of Embodiment 16, wherein the first slope is greater in absolute value than the second slope by a factor of at least 1.5.

Embodiment 19

The method of Embodiment 16, wherein:
the intermediate voltage is greater than the voltage of the reference terminal by at least 10% of a voltage defined by a difference in voltage between the input terminal and the reference terminal; and
the intermediate voltage is lower than the voltage of the input terminal by at least 10% of the voltage defined by the difference in voltage between the input terminal and the reference terminal.

Embodiment 20

The method of Embodiment 19, wherein the third slope is greater in absolute value than the second slope by a factor of at least 1.5.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Accordingly, the disclosure is to be regarded as illustrative rather than restrictive.

What is claimed is:

1. A circuit comprising:
an input node, a switching node, and a reference node;
a first switching element having a first current-carrying electrode coupled to the switching node;
a first charge storage element having a first terminal and a second terminal, wherein the first terminal of the first charge storage element is coupled to the switching node;
a first rectifying element having an anode and a cathode, wherein the anode of the first rectifying element is coupled to the second terminal of the first charge storage element, and the cathode of the first rectifying element is coupled to the input node; and
a second rectifying element having an anode and a cathode, wherein the cathode of the second rectifying element is coupled to the second terminal of the first charge storage element, and the anode of the second rectifying element is coupled to the reference node.

2. The circuit of claim 1, wherein the first switching element has a second current-carrying electrode that is coupled to the input node.

3. The circuit of claim 2, further comprising:
a first conduction path that couples the second current-carrying electrode of the first switching element to the input node;
a second conduction path that couples the cathode of the first rectifying element to the input node; and
at least part of the first conduction path is not included in the second conduction path, and at least part of the second conduction path is not included in the first conduction path.

4. The circuit of claim 3, further comprising a second charge storage element having a first terminal and a second terminal, wherein the first terminal of the second charge storage element is coupled to the input node through at least part of the second conduction path.

5. The circuit of claim 4, wherein the second terminal of the second charge storage element is coupled to the reference node.

6. The circuit of claim 3, further comprising a filter that lies along the first conduction path between the input node and the second current-carrying electrode of the first switching element.

7. The circuit of claim 6, wherein the cathode of the first rectifying element is coupled to an input of the filter.

8. The circuit of claim 3, further comprising a second switching element having a first current-carrying electrode coupled to the switching node.

9. The circuit of claim 8, wherein a second current-carrying electrode of the second switching element is coupled to the reference node.

10. The circuit of claim 1, wherein the first charge storage element has a capacitance in a range of 0.2 nF to 50 nF.

11. A circuit comprising:
a first switching element having a first current-carrying electrode and a second current-carrying electrode;
a first rectifying element having an anode and a cathode; and
a low-pass filter having an input terminal and an output terminal,
wherein:
a first power supply terminal is coupled to the cathode of the first rectifying element and an input terminal of the low-pass filter; and
the output of the low-pass filter is coupled to the first current-carrying electrode of the first switching element.

12. The circuit of claim 11, further comprising a charge storage element having a first terminal and a second terminal, wherein:

the first terminal is coupled to the anode of the first rectifying element; and the second terminal is coupled to the second current-carrying electrode of the first switching element.

13. The circuit of claim 12, further comprising a second rectifying element having an anode and a cathode, wherein the cathode of the second rectifying element is coupled to the first terminal of the charge storage element and the anode of the first rectifying element.

14. The circuit of claim 13, further comprising:

a second switching element having a first current-carrying electrode and a second current-carrying electrode, wherein:

the second current-carrying electrode of the first switching element, the first current-carrying electrode of the second switching element, and the second terminal of the charge storage element are coupled to a switching node; and a second power supply terminal is coupled to the second current-carrying electrode of the second switching element and the anode of the second rectifying element.

15. A method of using an electronic device including a circuit having an input terminal, a switching terminal, and a reference terminal, the method comprising:

changing a state of a switching element within the circuit to an off-state, wherein a waveform of the switching terminal comprises:

a first portion in which a voltage of the switching terminal is between the voltage of the input terminal and an intermediate voltage, wherein the intermediate voltage is between the voltage of the input terminal and the reference terminal, and wherein a change in voltage of the switching terminal during the first portion falls as a function of time along a first slope; and a second portion in which the voltage of the switching terminal is between the intermediate voltage and the voltage of the reference terminal, and wherein a change in voltage of the switching terminal during the second portion falls as a function of time along a second slope, wherein the second portion occurs after the first portion, and the first slope is larger in absolute value than the second slope.

16. The method of claim 15, further comprising:

changing a state of the switching element to an on-state before changing the state of the switching element to an off-state, wherein the pulse shape of the waveform of the switching terminal further comprises:

a third portion in which a voltage of the switching terminal is approximately the voltage of the reference terminal;

a fourth portion in which the voltage of the switching terminal rises between the voltage of the reference terminal and the voltage of the input terminal, wherein a change in voltage of the switching terminal during the fourth portion rises as a function of time along a third slope; and a fifth portion in which the voltage of the switching terminal is approximately the voltage of the input terminal.

17. The method of claim 16, wherein after changing the state of the switching element to an on-state:

the intermediate voltage is at least 1.2 V greater than the voltage of the reference terminal; and the intermediate voltage is at least 1.2 V lower than the voltage of the input terminal.

18. The method of claim 16, wherein the first slope is greater in absolute value than the second slope by a factor of at least 1.5.

19. The method of claim 16, wherein:

the intermediate voltage is greater than the voltage of the reference terminal by at least 10% of a voltage defined by a difference in voltage between the input terminal and the reference terminal; and the intermediate voltage is lower than the voltage of the input terminal by at least 10% of the voltage defined by the difference in voltage between the input terminal and the reference terminal.

20. The method of claim 19, wherein the third slope is greater in absolute value than the second slope by a factor of at least 1.5.

* * * * *